United States Patent
Almohsin et al.

(10) Patent No.: US 11,111,753 B2
(45) Date of Patent: Sep. 7, 2021

(54) POLYMER GEL COMPOSITIONS FOR TREATING AQUEOUS ZONES IN SUBTERRANEAN FORMATIONS AND METHODS OF TREATING THE AQUEOUS ZONES

(71) Applicant: Saudi Arabian Oil Company, Dhahran (SA)

(72) Inventors: Ayman Almohsin, Doha (SA); Jin Huang, Dhahran (SA); Mohammed Abdullah Bataweel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 16/451,793

(22) Filed: Jun. 25, 2019

(65) Prior Publication Data

US 2020/0408063 A1    Dec. 31, 2020

(51) Int. Cl.
  *E21B 33/138* (2006.01)
  *C09K 8/512* (2006.01)

(52) U.S. Cl.
  CPC ............ *E21B 33/138* (2013.01); *C09K 8/512* (2013.01)

(58) Field of Classification Search
  None
  See application file for complete search history.

(56) References Cited

U.S. PATENT DOCUMENTS

| | | | |
|---|---|---|---|
| 4,004,639 A | 1/1977 | Sandiford | |
| 4,069,869 A | 1/1978 | Sandiford | |
| 8,322,421 B2 | 12/2012 | Reddy et al. | |
| 9,169,433 B2 | 10/2015 | Nguyen et al. | |
| 9,932,512 B1 | 4/2018 | Hilfiger et al. | |
| 10,005,951 B2 | 6/2018 | Vo et al. | |
| 2006/0122071 A1* | 6/2006 | Reddy | C09K 8/508 507/219 |
| 2006/0162930 A1 | 7/2006 | Gronsveld et al. | |

(Continued)

FOREIGN PATENT DOCUMENTS

| | | |
|---|---|---|
| WO | 2013091023 A2 | 6/2013 |
| WO | 2018032051 A1 | 2/2018 |

OTHER PUBLICATIONS

International Search Report and Written Opinion dated Mar. 31, 2020 pertaining to International application No. PCT/US2019/067322 filed Dec. 19, 2019, 15 pgs.

(Continued)

*Primary Examiner* — Charles R Nold
(74) *Attorney, Agent, or Firm* — Dinsmore & Shohl LLP

(57) ABSTRACT

A polymer gel composition for treating an aqueous zone of a subterranean formation may include a base polymer, a cross-linking agent, and an adsorption system. The adsorption system may include one or more silane compounds or a combination of silane compounds and silicates. The adsorption system may improve bonding of the polymer gel composition to the pore surfaces of the rock in the aqueous zone. A method of treating an aqueous zone of a subterranean formation may include injecting the polymer gel composition into the aqueous zone of the formation and allowing the polymer gel composition to cure to form a cross-linked polymer gel matrix that provides a barrier that reduces or prevents the flow of aqueous materials from the aqueous zone to the wellbore.

20 Claims, 8 Drawing Sheets

(56) References Cited

U.S. PATENT DOCUMENTS

| | | | | |
|---|---|---|---|---|
| 2006/0234871 A1* | 10/2006 | Dalrymple | ............ | C09K 8/508 507/211 |
| 2009/0078419 A1* | 3/2009 | Dusterhoft | ............ | C09K 8/506 166/295 |
| 2016/0177162 A1 | 6/2016 | Nguyen et al. | | |
| 2017/0096598 A1 | 4/2017 | Vo et al. | | |
| 2018/0127557 A1 | 5/2018 | Reddy et al. | | |
| 2018/0215996 A1 | 8/2018 | Maxey et al. | | |

OTHER PUBLICATIONS

Al-Muntasheri et al., "Investigation of a High Temperature Organic Water Shutoff Gel: Reaction Mechanisms", SPE International, Society of Petroleum Engineers, SPE 97530, pp. 1-9, 2005.

Al-Muntasheri et al., "A Study of Polyacrylamide-Based Gels Crosslinked with Polyethyleneimine", SPE International, Society of Petroleum Engineers, SPE 105925, , pp. 1-9, 2007.

Al-Muntasheri et al., "Viscoelastic properties of a high temperature cross-linked water shut-off polymeric gel", Science Direct, Journal of Petroleum Science and Engineering, vol. 55, pp. 56-66, 2007.

Al-Nakhli et al., "A Breakthrough Water Shutoff System for Super-K Zones in Carbonate Ghawwar Field: Adsorption and Polymer System", SPE International, Society of Petroleum Engineers, SPE-183558-MS, pp. 1-24, 2016.

El-Karsani et al., "Gelatin of a Water-Shutoff Gel at High Pressure and High Temperature: Rheological Investigation", SPE Journal, pp. 1103-1112, Oct. 2015.

Hardy et al., "The First Carbonate Field Application of a New Organically Crosslinked Water Shutoff Polymer System", SPE international, Society of Petroleum Engineers, SPE 50738, pp. 1-16, 1999.

Mercado et al., "Successful Field Application of a High-Temperature Conformance Polymer in Mexico", SPE International, Society of Petroleum Engineers, SPE 121143, pp. 1-13, 2009.

Seright et al., "A Strategy for Attacking Excess Water Production", SPE Production & Facilities, pp. 158-169, Aug. 2003.

Vasquez et al., "Laboratory Evaluation of High-Temperature Conformance Polymer Systems", SPE international, Society of Petroleum Engineers, SPE 80904, pp. 1-11, 2003.

* cited by examiner

POLYMER GEL COMPOSITIONS FOR TREATING AQUEOUS ZONES IN SUBTERRANEAN FORMATIONS AND METHODS OF TREATING THE AQUEOUS ZONES

BACKGROUND

Field

The present disclosure relates to natural resource well drilling and hydrocarbon production from subterranean formations and, more specifically, to compositions and methods for treating aqueous zones of subterranean formations.

Technical Background

Production of hydrocarbons from a subterranean formation generally includes drilling at least one wellbore into the subterranean formation. The wellbore forms a pathway capable of permitting both fluids and apparatus to traverse between the surface and the subterranean formation. Besides defining the void volume of the wellbore, the wellbore wall also acts as the interface through which fluid can transition between the formations through which the wellbore traverses and the interior of the well bore.

During drilling of a wellbore into a subterranean formation or production of hydrocarbons from an existing wellbore, an aqueous zone may be encountered, which may result in aqueous materials flowing from the aqueous zone into the wellbore. These aqueous materials may commonly be referred to as produced water and may include aqueous materials naturally occurring in the subterranean formation, aqueous compositions injected into the subterranean formation for purposes of enhanced oil recovery, other aqueous materials, or combinations of aqueous materials. The increasing produced water caused by flow of aqueous materials from an aqueous zone to the wellbore may reduce the efficiency of hydrocarbon production from the wellbore by reducing the amount of hydrocarbons produced and increasing the costs of separating the produced water from the hydrocarbons.

SUMMARY

Accordingly, there is an ongoing need for compositions and methods for water control during drilling and hydrocarbon production from a subterranean formation. The compositions described in the present disclosure include a polymer gel composition that may include a base polymer, a cross-linking agent, and an adsorption system, the adsorption system comprising a silane compound or a silane compound and a silicate component. The polymer gel composition may have a viscosity of from 5 centipoise to 10 centipoise prior to injection into the aqueous zone and before cross-linking of the base polymer increases the viscosity. Methods of the present disclosure for treating an aqueous zone of a subterranean formation may include injecting the polymer gel composition of the present disclosure into the aqueous zone and curing the polymer gel composition. Curing the polymer gel composition may form a cross-linked polymer gel matrix that may produce a barrier between the aqueous zone and the wellbore. The barrier may be operable to reduce or prevent the flow of aqueous materials from the aqueous zone to the wellbore. The adsorption system that includes the silane compound or the silane compound and the silicate may improve adherence of the cross-linked polymer gel matrix to the surfaces of the rock in the pores of the subterranean formation compared to existing polymer systems without the adsorption system. The improved adherence of the cross-linked polymer gel matrix may increase the service life of the treatment to the aqueous zone, among other features.

According to one or more aspects of the present disclosure, a method for treating an aqueous zone of a subterranean formation may include injecting a polymer gel composition into at least a portion of the aqueous zone of the subterranean formation. The polymer gel composition may include a base polymer, a cross-linking agent, and an adsorption system that includes at least a silane compound. The polymer gel composition may have a viscosity of from 5 centipoise to 10 centipoise prior to injection into the aqueous zone. The method may further include curing the polymer gel composition in the portion of the aqueous zone to produce a cross-linked polymer gel matrix, where the cross-linked polymer gel matrix produces a barrier that reduces or prevents aqueous materials from flowing from the aqueous zone into a wellbore.

According to one or more other aspects of the present disclosure, a polymer gel composition for treating an aqueous zone of a subterranean formation may include from 3 weight percent to 10 weight percent base polymer based on the total weight of the polymer gel composition, from 0.3 weight percent to 2.0 weight percent cross-linking agent based on the total weight of the polymer gel composition, from 3 weight percent to 10 weight percent silane compound based on the total weight of the polymer gel composition, and the balance water.

Additional features and advantages of the technology described in the present disclosure will be set forth in the detailed description that follows, and in part will be readily apparent to those skilled in the art from the description and drawings or recognized by practicing the technology as described in this disclosure, including the detailed description that follows, the claims as well as the appended drawings.

BRIEF DESCRIPTION OF THE DRAWINGS

The following detailed description of specific embodiments of the present disclosure can be best understood when read in conjunction with the following drawings, in which like structure is indicated with like reference numerals and in which.

Figure 1:
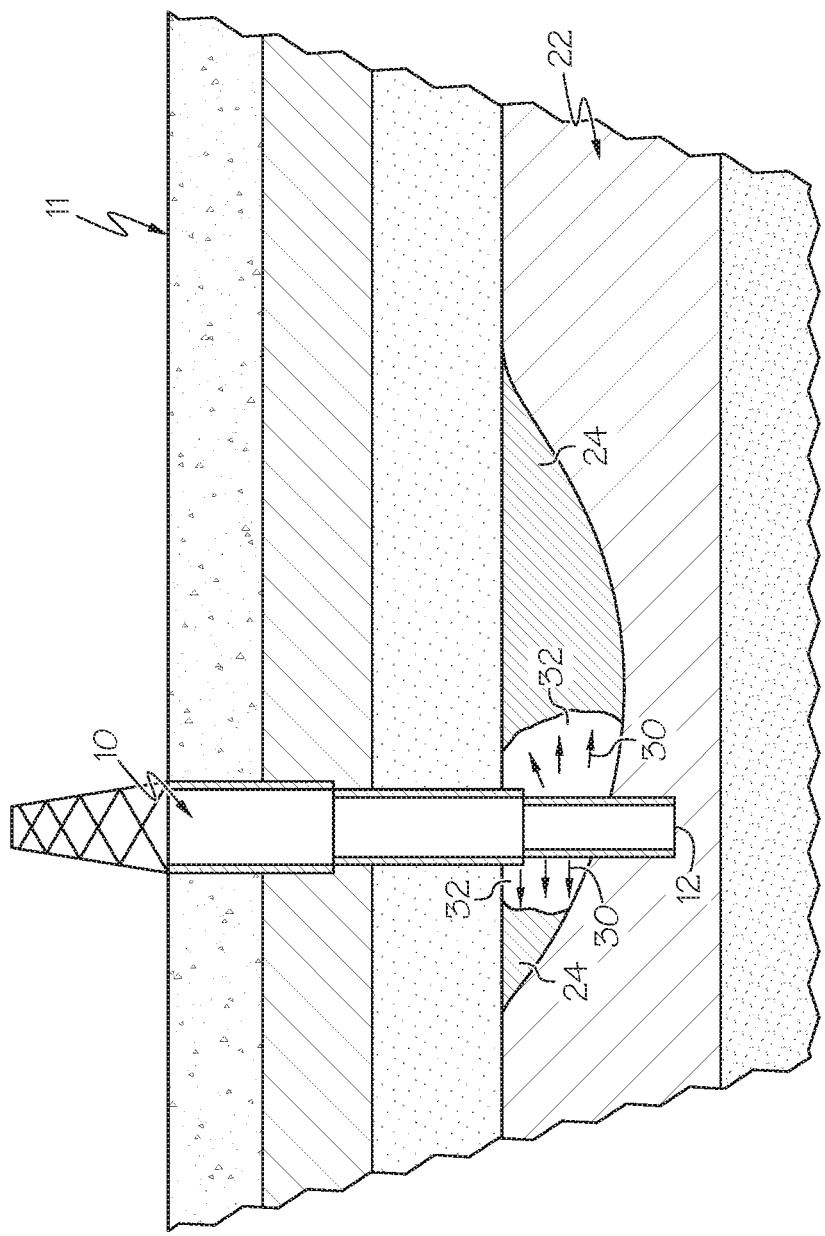
FIG. 1 schematically depicts treatment of an aqueous zone in a subterranean formation using a polymer gel composition, according to one or more embodiments shown and described in the present disclosure.

For the purpose of describing the simplified schematic illustrations and descriptions of FIG. 1, the numerous valves, temperature sensors, flow meters, pressure regulators, electronic controllers, pumps, and the like that may be employed and well known to those of ordinary skill in the art of resource well drilling and hydrocarbon production may not be depicted in the drawings. Though not depicted, it should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed to compositions and methods for treating aqueous zones of a subterranean formation during hydrocarbon drilling and production. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geologic properties throughout the subterranean formation, including, but not limited to, porosity and permeability. A single subterranean formation may include different regions, such as but not limited to a hydrocarbon-containing formation that includes hydrocarbons and aqueous zones that include aqueous materials. To produce hydrocarbons from the hydrocarbon regions of the subterranean formation, production wells (wellbore) are drilled to a depth that enables these hydrocarbons to travel from the subterranean formation to the surface.

As used throughout the present disclosure, the term "hydrocarbon-bearing formation" may refer to a subterranean geologic region of a subterranean formation, the subterranean geologic region containing hydrocarbons, such as crude oil, hydrocarbon gases, or both, which may be extracted from the subterranean geologic region.

As used throughout the present disclosure, the term "aqueous zone" may refer to a subterranean geologic region of a subterranean formation, in which the subterranean geologic region contains aqueous materials, such as but not limited to naturally-occurring aqueous materials or aqueous compositions injected into the subterranean formation for purposes of enhanced oil recovery, for example. The aqueous zone may include the subterranean geologic region containing the aqueous phase as well as the pathways through the subterranean formation from the aqueous zone to the wellbore.

As used throughout the present disclosure, the term "wellbore" may refer to the drilled hole or borehole, including the openhole or uncased portion of the well.

As used throughout this disclosure, the term "fluid" may include liquids, gases, or both. As used throughout the disclosure, "spacer fluid" may refer to a fluid utilized to space apart any two other materials utilized in wellbore drilling or hydrocarbon production. As used throughout the present disclosure, the term "displacement fluid" may refer to a fluid injected into the wellbore to force a previously injected fluid into the subterranean formation.

As used throughout this disclosure, the term "cure" or "curing," when used in the context of the polymer gel composition, may refer to the process of cross-linking the base polymer, which may be in a liquid form initially, with the cross-linking agent to form the cross-linked polymer gel matrix, which may be a gel. As used throughout this disclosure, the term "gel" may refer to a dilute cross-linked polymer system that exhibits no flow at steady-state.

As used throughout this disclosure, the term "gelation time," when used in the context of the polymer gel composition, may refer to a time duration between a first time at which the cross-linking agents are added to the polymer gel composition and a second time at which the polymer gel composition has cross-linked to form the cross-linked polymer gel matrix capable of reducing or preventing the flow of aqueous materials through the formation. The gelation time may be the cure time of the polymer gel composition.

As previously discussed, the increasing aqueous phase produced from a subterranean formation caused by encountering an aqueous zone may reduce the efficiency of hydrocarbon production from the wellbore by reducing the amount of hydrocarbons produced and increasing the costs of separating the produced water from the hydrocarbons. Existing polymer systems for treating aqueous zone may generally include a cross-linked gel that restricts flow of aqueous materials from the aqueous zone to the wellbore. However, these existing polymer systems may not adhere well to the rock surfaces in the pores of the subterranean formation, which may result in the formation pressure within the aqueous zone moving the polymer gel and ultimately breaking down the barrier formed by the polymer gel. Thus, existing polymer systems for treating aqueous zones may have limited lifespan and may be susceptible to sweep and failure of the barrier intended to control flow of aqueous materials into the wellbore. As used in the present disclosure, the term "sweep" may refer to the aqueous materials from the aqueous zone flooding the polymer gel treatment and sweeping the polymer gel from the pores in the aqueous zone.

The present disclosure is directed to compositions and methods for treating aqueous zones of a subterranean formation. The compositions of the present disclosure are directed to a polymer gel composition that may include a base polymer, a cross-linking agent, and an adsorption system. The adsorption system may include a silane compound or a silane compound and a silicate component. The polymer gel composition may have a viscosity of from 5 centipoise to 10 centipoise prior to injection into the water zone. Methods of the present disclosure for treating an aqueous zone of a subterranean formation may include injecting the polymer gel composition of the present disclosure into the aqueous zone and curing the polymer gel composition. Curing the polymer gel composition may form a cross-linked polymer gel matrix that may form a barrier between the aqueous zone and the wellbore. The barrier may be operable to reduce or prevent the flow of aqueous materials from the aqueous zone to the wellbore. The adsorption system that includes the silane compound or the silane compound and the silicate may improve adherence of the cross-linked polymer gel matrix to the surfaces of the rock in the pores of the subterranean formation compared to existing polymer systems without the adsorption system. In particular, the adsorption system may provide chemical bonding of the cross-linked polymer gel matrix to the rock surfaces in the pores of the subterranean formation, which improves the adhesion. The improved adherence of the cross-linked polymer gel matrix may increase the service life of the treatment to the aqueous zone, among other features.

The base polymer may be a polymer that is capable of being cross-linked to form a cross-linked polymer matrix within the pores of the subterranean formation. The base polymer may include polyacrylamide homopolymer, a copolymer of acrylamide monomer units and acrylate monomer units, or a mixture of polyacrylamide homopolymer and a copolymer of acrylamide monomer units and acrylate monomer units. The copolymer of acrylamide units and acrylate units may be poly[acrylamide-co-(tert-butyl acrylate)] (PAtBA), which is provided subsequently in this disclosure in structural formula (I).

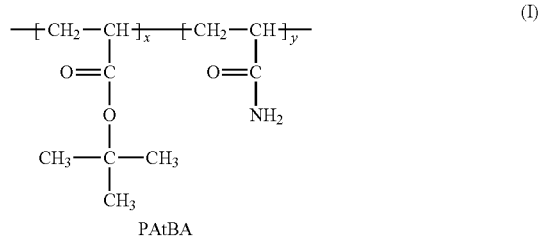

PAtBA

In structural formula (I), x is the number of tert-butyl acrylate monomer units and y is the number of acrylamide monomer units. When present in the base polymer, the poly[acrylamide-co-(tert-butyl acrylate)] may include greater than or equal to 1 mole percent (mol %), greater than or equal to 2 mol %, greater than or equal to 3 mol %, or even greater than or equal to 4 mol % tert-butyl acrylate monomer units based on the total moles of tert-butyl acrylate monomer units and acrylamide monomer units in the poly [acrylamide-co-(tert-butyl acrylate)]. In some embodiments, the poly[acrylamide-co-(tert-butyl acrylate)] (PAtBA) in the base polymer may include from 1 mol % to 50 mol %, from 1 mol % to 20 mol %, from 1 mol % to 10 mol %, from 2 mol % to 50 mol %, from 2 mol % to 20 mol %, from 2 mol % to 10 mol %, from 3 mol % to 50 mol %, from 3 mol % to 20 mol %, from 3 mol % to 10 mol %, from 4 mol % to 50 mol %, from 4 mol % to 20 mol %, or from 4 mol % to 10 mol % tert-butyl acrylate monomer units based on the total moles of tert-butyl acrylate monomer units and acrylamide monomer units in the PAtBA. In some embodiments, the base polymer may include polyacrylamide homopolymer, poly[acrylamide-co-(tert-butyl acrylate)], or polyacrylamide homopolymer and poly[acrylamide-co-(tert-butyl acrylate)].

The base polymer may have an average molecular weight sufficient so that, when the base polymer is cross-linked by the cross-linking agent, the resulting cross-linked polymer gel matrix may reduce or prevent the flow of water through the pores of the aqueous zone in the subterranean formation. The base polymer may have an average molecular weight of greater than or equal to 250,000 grams per mole (g/mol), greater than or equal to 300,000 g/mol, or even greater than or equal to 350,000 g/mol. The base polymer may have an average molecular weight of less than or equal to 500,000 g/mol, less than or equal to 450,000 g/mol, or even less than or equal to 400,000 g/mol. In some embodiments, the base polymer may have an average molecular weight of from 250,000 g/mol to 500,000 g/mol, such as from 250,000 g/mol to 450,000 g/mol, from 250,000 g/mol to 400,000 g/mol, from 250,000 g/mol to 350,000 g/mol, from 300,000 g/mol to 500,000 g/mol, from 300,000 g/mol to 450,000 g/mol, from 300,000 g/mol to 400,000 g/mol, from 300,000 g/mol to 350,000 g/mol, from 350,000 g/mol to 500,000 g/mol, from 350,000 g/mol to 450,000 g/mol, from 350,000 g/mol to 400,000 g/mol, or from 400,000 g/mol to 500,000 g/mol. The average molecular weight in the present disclosure may refer to a weight average molecular weight determined through gel permeation chromatography (GPC) using well-known conventional test methods, analytical equipment and testing software.

The polymer gel composition may include an amount of the base polymer sufficient to form a cross-linked polymer gel matrix upon curing that is sufficient to block the pores of the subterranean formation to form a barrier that reduces or prevents the flow of aqueous materials through the cross-linked polymer gel matrix. The polymer gel composition may include greater than or equal to 3 weight percent (wt. %), greater than or equal to 5 wt. %, or greater than or equal to 7 wt. % base polymer based on the total weight of the polymer gel composition. The polymer gel composition may include less than or equal to 10 wt. %, less than or equal to 9 wt. %, less than or equal to 8 wt. %, or even less than or equal to 7 wt. % base polymer based on the total weight of the polymer gel composition. In some embodiments, the polymer gel composition may include from 3 wt. % to 10 wt. %, from 3 wt. % to 9 wt. %, from 3 wt. % to 8 wt. %, from 3 wt. % to 7 wt. %, from 5 wt. % to 10 wt. %, from 5 wt. % to 9 wt. %, from 5 wt. % to 8 wt. %, from 5 wt. % to 7 wt. %, from 7 wt. % to 10 wt. %, from 7 wt. % to 9 wt. %, from 7 wt. % to 8 wt. %, or from 8 wt. % to 10 wt. % base polymer based on the total weight of the polymer gel composition.

The cross-linking agent may be operable to cross-link the base polymer to produce a cross-linked polymer gel matrix. The polymer gel composition may include one or a plurality of cross-linking agents. The cross-linking agent may be an organic cross-linking agent. In some embodiments, the cross-linking agent may include one or a plurality of imine functional groups. In some embodiments, the cross-linking agent may be polyethyleneimine. The polyethyleneimine may be a linear or branched polyethyleneimine.

The cross-linking agent may have an average molecular weight sufficient to cross-link the base polymer to produce a cross-linked polymer gel matrix within the pores of the subterranean formation. The cross-linking agent may have an average molecular weight of greater than or equal to 50 g/mol, greater than or equal to 60 g/mol, or even greater than or equal to 70 g/mol. The cross-linking agent may have an average molecular weight of less than or equal to 100 g/mol, less than or equal to 90 g/mol, or even less than or equal to 80 g/mol. In some embodiments, the cross-linking agent may have an average molecular weight of from 50 g/mol to 100 g/mol, such as from 50 g/mol to 90 g/mol, from 50 g/mol to 80 g/mol, from 60 g/mol to 100 g/mol, from 60 g/mol to 90 g/mol, from 60 g/mol to 80 g/mol, from 70 g/mol to 100 g/mol, from 70 g/mol to 90 g/mol, or from 70 g/mol to 80 g/mol. The average molecular weight of the cross-linking agent may be a weight average molecular weight determined through well-known GPC methods.

The polymer gel composition may include an amount of the cross-linking agent sufficient to cross-link the base polymer to form a cross-linked polymer gel matrix sufficient to block the pores of the subterranean formation to form a barrier that reduces or prevents the flow of aqueous materials through the cross-linked polymer gel matrix. The polymer gel composition may include greater than or equal to 0.3 wt. %, greater than or equal to 0.5 wt. %, or greater than or equal to 0.7 wt. % cross-linking agent based on the total weight of the polymer gel composition. The polymer gel composition may include less than or equal to 2 wt. %, less than or equal to 1.5 wt. %, or even less than or equal to 1 wt. % cross-linking agent based on the total weight of the polymer gel composition. In some embodiments, the polymer gel composition may include from 0.3 wt. % to 2 wt. %, from 0.3 wt. % to 1.5 wt. %, from 0.3 wt. % to 1.0 wt. %, from 0.5 wt. % to 2 wt. %, from 0.5 wt. % to 1.5 wt. %, from 0.5 wt. % to 1.0 wt. %, from 0.7 wt. % to 2 wt. %, from 0.7 wt. % to 1.5 wt. %, from 0.7 wt. % to 1.0 wt. %, or from 1 wt. % to 2 wt. % cross-linking agent based on the total weight of the polymer gel composition.

As previously discussed, the polymer gel compositions of the present disclosure may include an adsorption system operable to increase the adhesion of the cross-linked polymer gel matrix to the rock surface of the pores of the subterranean formation. The adsorption system may include at least a silane compound. The adsorption system may also include a silicate component. The composition of the adsorption system may be modified based on the type of rock in the subterranean formation. For example, subterranean formations comprising a greater concentration of silicates, such as sandstone formations, may allow for a polymer gel composition to have an adsorption system comprising only the silane compounds and no silicates. In other formations, such as carbonate formations for example, the subterranean formation may have a lesser concentration of silicates, in which case the adsorption system of the polymer gel composition may include both the silane compounds and the silicate components.

The silane compound of the adsorption system may be a silane compound that is capable of undergoing chemical reaction with the surface of the rock in the subterranean formation to form chemical bonds with the surface of the rock. In particular, the silane compound may include at least one functional group capable of undergoing a condensation reaction or other chemical reaction with silicate ions to form a chemical bond with the silicate. The silane compound may also have an amine functional group, which may be operable to chemically bond the silane compound to the cross-linked polymer gel matrix. For example, in some embodiments, the amine group of the silane compound may undergo an amidation chemical reaction to form a chemical bond with the cross-linked polymer gel matrix formed by curing of the base polymer and cross-linking agent.

The silane compound may be an amino-silane compound, which may have at least one amine functional group. For example, in some embodiments, the silane compound may have the following chemical formula (II):

$$H_2N-R^1-Si(R^2)_3 \quad\quad\quad (II)$$

In which $R^1$ is a linear or branched hydrocarbyl having from 1 to 20 carbon atoms. In chemical formula (II), at least one $R^2$ is an alkoxy group having general formula ($-O-R^3$), where $R^3$ can be a linear or branched hydrocarbyl having from 1 to 10 carbon atoms, and each of the other $R^2$ groups can be independently selected from a linear or branched hydrocarbyl having from 1 to 10 carbons, an amine group, or an alkoxy group having general formula ($-O-R^3$), where $R^3$ can be a linear or branched hydrocarbyl having from 1 to 10 carbon atoms.

In some embodiments, $R^1$ may include 1, 2, 3, 4, or 5 carbon atoms. In some embodiments, $R^1$ may be propyl ($-CH_2CH_2CH_2-$). In some embodiments, at least one $R^2$ may be an ethoxy group ($-O-CH_2CH_3$) or a methoxy group ($-O-CH_3$). In some embodiments, each $R^2$ may be an ethoxy group or a methoxy group. In some embodiments, at least one $R^2$ may be an ethoxy group and at least one other $R^2$ may be an amine group. In some embodiments, the silane compound may include 3-aminopropyltriethoxysilane, 3-aminopropyltrimethoxysilane, or a combination of these silane compounds.

The polymer gel composition may include an amount of the silane compound that is sufficient to chemically bond the cross-linked polymer gel matrix to the rock surface in the pores of the subterranean formation. The polymer gel composition may have greater than or equal to 3 wt. %, greater than or equal to 5 wt. %, or even greater than or equal to 7 wt. % silane compound based on the total weight of the polymer gel composition. The polymer gel composition may have less than or equal to 10 wt. %, less than or equal to 9 wt. %, or even less than or equal to 7 wt. % silane compound based on the total weight of the polymer gel composition. In some embodiments, the polymer gel composition may have from 3 wt. % to 10 wt. %, from 3 wt. % to 9 wt. %, from 3 wt. % to 7 wt. %, from 3 wt. % to 5 wt. %, from 5 wt. % to 10 wt. %, from 5 wt. % to 9 wt. %, from 5 wt. % to 7 wt. %, from 7 wt. % to 10 wt. %, from 7 wt. % to 9 wt. %, or from 9 wt. % to 10 wt. % silane compounds based on the total weight of the polymer gel composition. If the amount of the silane compounds is less than 3 wt. %, the amount of silane compound in the polymer gel composition may not be enough to sufficiently bond the cross-linked polymer gel matrix to the rock surface, which may lead to a reduction in service life of the aqueous control treatment. If the amount of the silane compound is too great, then the amounts of base polymer, cross-linking agent, or both may not be sufficient to produce a cross-linked polymer gel matrix sufficient to reduce or prevent flow of aqueous materials from the aqueous zone in the subterranean formation. The concentration of the silane compounds in the polymer gel composition may modify the gelation time of the polymer gel composition. For example, increasing the concentration of silane compounds in the polymer gel composition may increase the gelation time. Similarly, decreasing the concentration of silane compounds in the polymer gel composition may decrease the gelation time.

The polymer gel composition may also include one or a plurality of silicate components. The silicate components may include an alkali metal silicate, such as but not limited to sodium silicate, potassium silicate, or combinations of these silicates. In some embodiments, the silicate component may include sodium silicate, potassium silicate, or both. In some subterranean formations, such as carbonate rock formations, for example, the rock surface may have a reduced concentration of silicates. In these circumstances, the polymer gel composition may include a silicate component to aide in chemically bonding the silane compounds to the rock surfaces. For example, in carbonate formations having lesser silicate concentrations, some hydroxyl groups of the silicate components may disassociate and may form ionic bonds with the metal ions, such as calcium ions, eluted from the rock surface. Other hydroxyl groups on the silicate components may undergo a condensation reaction with the alkoxy groups on the silane compounds to chemically bond the silicate components to the silane compounds. The bonded silane compound and silicate component may precipitate in the pores to form a silaceous layer on the pore surfaces. As previously discussed, the silane compounds may be chemically coupled to the cross-linked polymer gel matrix through reaction between the amine group of the silane compounds and reactive groups of the cross-linked polymer gel matrix.

The polymer gel composition may include an amount of the silicate component capable of providing sufficient bonding between the silane compound and the rock surface. The polymer gel composition may include greater than or equal to 2 wt. %, greater than or equal to 3 wt. %, or even greater than or equal to 4 wt. % silicate components based on the total weight of the polymer gel composition. The polymer gel composition may have less than or equal to 7 wt. %, less than or equal to 6 wt. %, or even less than or equal to 5 wt. % silicate components based on the total weight of the polymer gel composition. In some embodiments, the polymer gel composition may have from 2 wt. % to 7 wt. %, from 2 wt. % to 6 wt. %, from 2 wt. % to 5 wt. %, from 2 wt. % to 4 wt. %, from 3 wt. % to 7 wt. %, from 3 wt. % to 6 wt. %, from 3 wt. % to 5 wt. %, from 3 wt. % to 4 wt. %, from 4 wt. % to 7 wt. %, from 4 wt. % to 6 wt. %, from 4 wt. % to 5 wt. %, or from 5 wt. % to 7 wt. % silicate components based on the total weight of the polymer gel composition. In some embodiments, the polymer gel composition may not include the silicate component.

The polymer gel composition may be an aqueous composition in which the balance of the polymer gel composition is water. The water may be distilled water, deionized water, municipal water, well water, freshwater (such as from a lake or river), seawater, salt water, natural or synthetic brine, formation water, produced water, brackish water, or combinations of these. In some embodiments, the water may contain additives or contaminants, such as but not limited to salts or other ionic species, particulate contaminants, dissolved solids, organic compounds, or combinations of additives or contaminants.

The polymer gel composition may include an amount of water sufficient to provide an initial viscosity of the polymer gel composition before cross-linking of from 5 centipoise to 10 centipoise. The polymer gel composition may include greater than or equal to 60 wt. % water, such as greater than or equal to 65 wt. %, greater than or equal to 70 wt. %, or even greater than or equal to 75 wt. % water based on the total weight of the polymer gel composition. The polymer gel composition may have less than or equal to 93 wt. % water, such as less than or equal to 91 wt. %, less than or equal to 90 wt. %, less than or equal to 85 wt. %, or even less than or equal to 80 wt. % water based on the total weight of the polymer gel composition. In some embodiments, the polymer gel composition may include from 60 wt. % to 93 wt. %, from 60 wt. % to 91 wt. %, from 60 wt. % to 85 wt. %, from 60 wt. % to 80 wt. %, from 65 wt. % to 93 wt. %, from 65 wt. % to 91 wt. %, from 65 wt. % to 85 wt. %, from 65 wt. % to 80 wt. %, from 70 wt. % to 93 wt. %, from 70 wt. % to 91 wt. %, from 70 wt. % to 85 wt. %, from 70 wt. % to 80 wt. %, from 75 wt. % to 93 wt. %, from 75 wt. % to 91 wt. %, from 75 wt. % to 85 wt. %, from 75 wt. % to 80 wt. %, from 80 wt. % to 93 wt. %, from 80 wt. % to 91 wt. %, or from 85 wt. % to 93 wt. % water based on the total weight of the polymer gel composition. An insufficient concentration of water in the polymer gel composition may result in increased viscosity of the polymer gel composition, which may reduce penetration of the polymer gel composition into the aqueous zone of the formation. If the concentration of water in the polymer gel composition is too great, the polymer gel composition may not include sufficient base polymer, cross-linking agent, silane compound, or silicate to form a barrier capable to prevent the flow of water through the pores of the subterranean formation.

The polymer gel composition may also include one or a plurality of additives. Additives may include, but are not limited to, salts, fillers, organic compounds, preservatives, rheology modifiers, or combinations of additives. Salts may be added to the polymer gel composition to reduce or prevent clay swelling in the subterranean formation. Salts that may be present in or added to the polymer gel composition may include, but are not limited to, alkali metal chlorides, hydroxides, or carboxylates. In some embodiments, suitable salts may include sodium, calcium, cesium, zinc, aluminum, magnesium, potassium, strontium, silicon, lithium, ammonium, chlorides, bromides, carbonates, iodides, chlorates, bromates, formates, nitrates, sulfates, phosphates, oxides, fluorides, and combinations of these. In some embodiments, the polymer gel composition may include calcium chloride, ammonium chloride, potassium chloride, or combinations of these. The polymer gel composition may include a concentration of salts sufficient to provide the polymer gel composition with a salinity of from 0.1 wt. % to 5 wt. %. In some embodiments, the polymer gel composition may also include filler particles, such as but not limited to silica particles.

In some embodiments, a polymer gel composition for treating an aqueous zone of a subterranean formation may include at least from 3 wt. % to 10 wt. % base polymer based on the total weight of the polymer gel composition, from 0.3 wt. % to 2.0 wt. % cross-linking agents based on the total weight of the polymer gel composition, from 3 wt. % to 10 wt. % silane compounds based on the total weight of the polymer gel composition, and the balance water. The base polymer, cross-linking agent, and silane compounds may have any other concentrations described in the present disclosure for these components. The polymer gel composition may additionally include from 2 wt. % to 7 wt. % aqueous silicate solution based on the total weight of the polymer gel composition. The polymer gel composition may optionally include one or a plurality of additives, such as but not limited to salts such as ammonium chloride or potassium chloride or fillers such as silica, for example. In some embodiments, the polymer gel composition for treating an aqueous zone of a subterranean formation may consist of or consist essentially of from 3 wt. % to 10 wt. % base polymer based on the total weight of the polymer gel composition, from 0.3 wt. % to 2.0 wt. % cross-linking agents based on the total weight of the polymer gel composition, from 3 wt. % to 10 wt. % silane compounds based on the total weight of the polymer gel composition, optionally from 2 wt. % to 7 wt. % aqueous silicate solution based on the total weight of the polymer gel composition, optionally one or a plurality of additives, and the balance water.

In some embodiments, the polymer gel composition may be produced by adding the components of the adsorption system to water while agitating or stirring the water. The adsorption system may include the silane compounds or the silane compounds and the silicate components. Additives such as but not limited to salts or fillers may be added to the mixture, and the mixture may be stirred or agitated until the salts are completely dissolved. Next, the base polymer or base polymers may be added to the mixture. The cross-linking agent may be added last. After adding the cross-linking agent, the mixture may be further stirred or agitated to homogenize the mixture to form the polymer gel composition. The base polymer, cross-linking agent, silane compounds, and silicates may be present in the aqueous solution of the polymer gel composition independent of one another before curing and cross-linking of the polymer gel composition. In other words, upon initial mixing and before cross-linking, the polymer gel composition may include the base polymer, cross-linking agent, silane compounds, and silicates in aqueous solution as separate species not interconnected in any way. Not intending to be bound by any particular theory, it is believed that the silane compounds, silicate component, or both, existing as independent and separate species in aqueous solution may enable the silane compounds, silicate components, or both, to be positioned between the pore surfaces and the base polymer so that the silane compounds and silicate components can chemically bond to the pore surface and base polymer to improve the adherence of the cross-linked polymer gel matrix to the pore surfaces.

The polymer gel composition may have an initial viscosity that enables the polymer gel composition to be injected into the aqueous formation. Once the cross-linking agent is added to the base polymer in the polymer gel composition, the cross-linking agent may begin reacting with the base polymer to cross-link the base polymer. As the cross-linking reaction proceeds, the degree of cross-linking may reach a threshold degree of cross-linking beyond which further cross-linking may increase the viscosity of the polymer gel composition. Thus, as used in the present disclosure, the initial viscosity of the polymer gel composition is the viscosity of the polymer gel composition at surface atmospheric conditions after combining all of the constituents and before cross-linking progresses to a degree sufficient to change the viscosity of the polymer gel composition. Surface atmospheric conditions may refer to standard temperature and pressure at the surface of the wellbore. The polymer gel composition may have an initial viscosity less than or equal to 10 centipoise (cP), less than or equal to 9 cP, or even less than or equal to 8 cP. In some embodiments, the polymer gel composition may have an initial viscosity of from 5 cP to 10 cP, from 5 cP to 9 cP, from 5 cP to 8 cP, from 6 cP to 10 cP, from 6 cP to 9 cP, from 6 cP to 8 cP, from 7 cP to 10 cP, from 7 cP to 9 cP from 7 cP to 8 cP, or from 8 cP to 10 cP.

The polymer gel composition may have a pH of greater than or equal to 9 or greater than or equal to 10. The polymer gel composition may have a pH of from 9 to 14, from 9 to 13, from 9 to 12, from 10 to 14, from 10 to 13, or from 10 to 12. The salinity of the polymer gel composition may influence the gelation time and gel strength of the polymer gel composition. Greater salinity may operate to reduce the gel strength and increase the gelation time of the polymer gel composition. The gelation time of the polymer gel composition may refer to the time elapsed between adding the cross-linking agent to the base polymer and the time at which the polymer gel composition forms a cross-linked polymer gel matrix capable of reducing or preventing water flow through the cross-linked polymer gel matrix. The polymer gel composition may have a salinity low enough to allow the polymer gel composition to cure to form a cross-linked polymer gel matrix in a gelation time of less than 4 hours. The polymer gel composition may have a salinity of less than or equal to 4 wt. %, less than or equal to 3.5 wt. %, less than or equal to 3 wt. %, less than or equal to 2.5 wt. %, or even less than or equal to 2 wt. % based on the total weight of the polymer gel composition. In some embodiments, the polymer gel composition may have a salinity of from greater than 0.0 wt. % to 4 wt. %, from greater than 0.0 wt. % to 3.5 wt. %, from greater than 0.0 wt. % to 3 wt. %, from 0.1 wt. % to 4 wt. %, from 0.1 wt. % to 3.5 wt. %, from 0.1 wt. % to 3.0 wt. %, from 0.5 wt. % to 4 wt. %, from 0.5 wt. % to 3.5 wt. %, or from 0.5 wt. % to 3 wt. %.

Referring now to FIG. 1, operation of the polymer gel composition to treat an aqueous zone of a subterranean formation will now be described. As shown in FIG. 1, a wellbore 10 may be drilled from the surface 11 to the subterranean formation 22 such that the downhole end 12 of the wellbore 10 may extend into or through the subterranean formation 22. While drilling the wellbore 10, one or more aqueous zones 24 may be encountered, which may result in flow of aqueous materials from the aqueous zone into the wellbore 10. The polymer gel compositions 30 of the present disclosure may be prepared at the surface 11 and injected into the aqueous zone 24 proximate the downhole end 12 of the wellbore 10. The polymer gel composition 30 may flow into the pores in the formation in the aqueous zone 24 and may cure to form a cross-linked polymer gel matrix within the pores of the aqueous zone 24.

The base polymer of the polymer gel composition 30 may be in liquid form initially. Upon combining the base polymer with the cross-linking agents to form the polymer gel composition 30, the base polymer reacts with the cross-linking agents to transform into a cross-linked polymer gel matrix. Transition of the base polymer from a liquid to cross-linked gel may include formation of covalent bonds via cross-linking reactions that may initially build viscosity in polymer gel composition. At a crossover point in the curing process, the polymer gel composition may begin to form into a non-porous three-dimensional polymer gel matrix. As this non-porous three-dimensional gel matrix begins to form, the polymer gel composition may transmit hydrostatic pressure to the formation until a barrier 32 comprising the cross-linked polymer gel matrix forms within the pores of the formation.

The polymer gel composition of the present disclosure may have a gelation time of less than or equal to 8 hours, such as a gelation time less than or equal to 6 hours or even less than or equal to 4 hours. The polymer gel composition may have a gelation time of from 1 hour to 8 hours, from 1 hour to 6 hours, from 1 hour to 4 hours, from 2 hours to 8 hours, from 2 hours to 6 hours, from 2 hours to 4 hours, from 3 hours to 8 hours, from 3 hours to 6 hours, from 3 hours to 4 hours, or from 4 hours to 8 hours. The gelation time of the polymer gel compositions may be influenced by at least the downhole conditions in the subterranean formation 22 and the salinity, pH, and composition of the polymer gel composition 30. For example, increasing downhole temperature may decrease the gelation time by increasing the reaction rate between the base polymer and the cross-linking agent. Increasing the salinity of the polymer gel composition may increase the gelation time of the polymer gel composition. Additionally, increasing the concentration of the cross-linking agent may decrease the gelation time of the polymer gel composition.

The barrier 32 formed by the cross-linked polymer gel matrix may be impermeable or semi-impermeable to water. The barrier 32 formed by the cross-linked polymer gel matrix may reduce or prevent the flow of aqueous materials from the aqueous zone 24 into the wellbore 10. The adsorption system comprising the silane compounds or the silane compounds and the silicates may increase adherence of the cross-linked polymer gel matrix to the rock surfaces in the pores of the formation in the aqueous zone 24 by chemically bonding the cross-linked polymer gel matrix to the rock surface. The greater adherence of the cross-linked polymer gel matrix to the rock surface may increase the plugging efficiency of the cross-linked polymer gel matrix to produce a more effective barrier 32 compared to existing polymer gel systems for treating aqueous zones.

Figure 2:
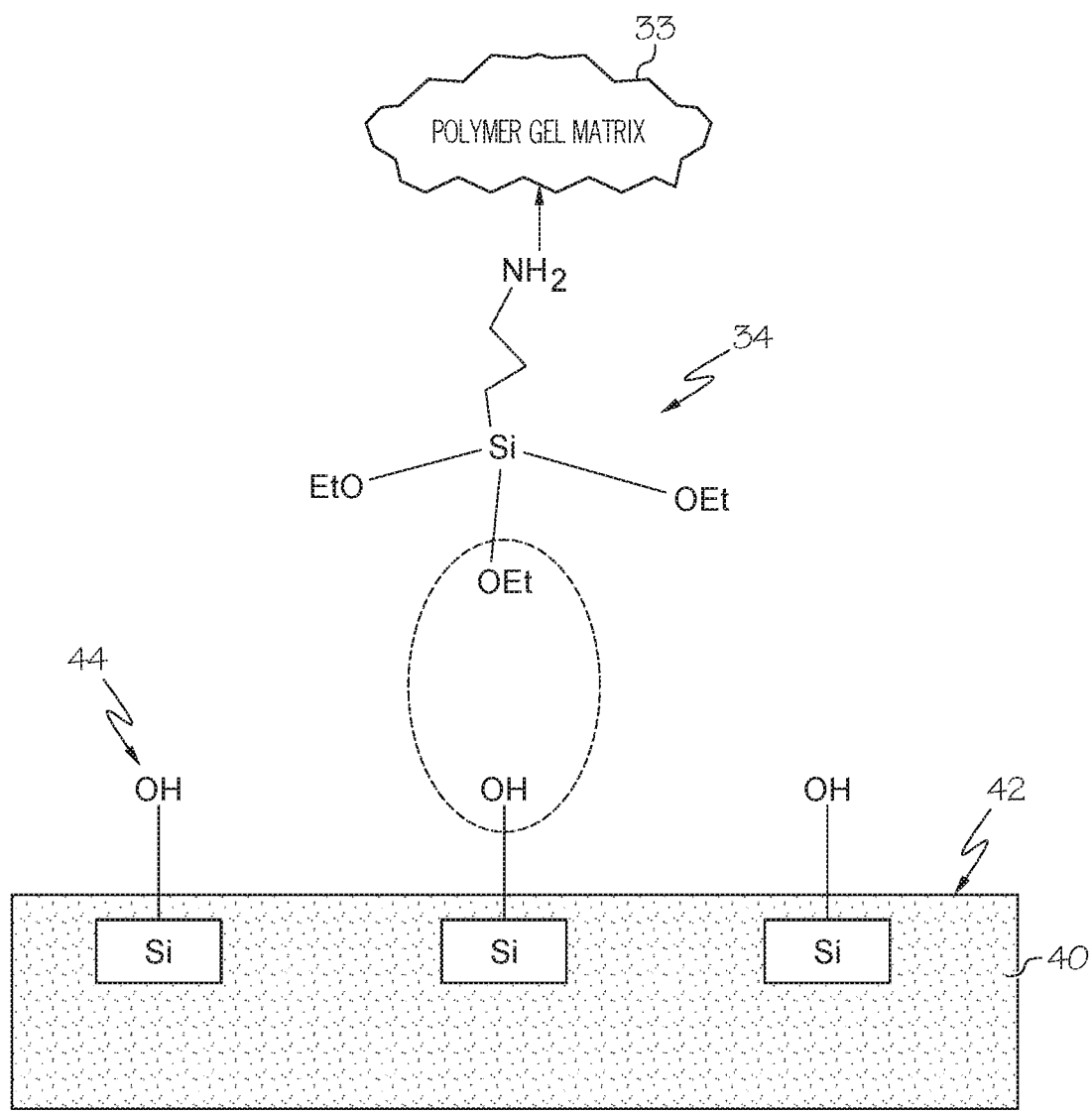
FIG. 2 schematically depicts operation of an adsorption system of a polymer gel composition to chemically adhere the polymer gel composition to pore surfaces of a sandstone formation, according to one or more embodiments shown and described in the present disclosure.

Referring now to FIG. 2, operation of the adsorption system for chemically bonding the cross-linked polymer gel matrix 33 to an aqueous zone comprising a sandstone 40 is schematically depicted. The polymer gel composition for treating an aqueous zone comprising sandstone 40 may include the base polymer, the cross-linking agent, and the silane compounds 34. In particular, in some embodiments, the polymer gel composition for treating an aqueous zone comprising sandstone 40 may include from 3 wt. % to 10 wt. % base polymer, from 0.3 wt. % to 2 wt. % cross-linking agent, from 3 wt. % to 10 wt. % silane compounds, and the balance water. The weight percentages are based on the total weight of the polymer gel composition. The base polymer, cross-linking agent, and silane compounds may be any of the compounds previously described in this disclosure for the base polymer, cross-linking agent, and silane compound, respectively. In some embodiments, the polymer gel composition for treating an aqueous zone comprising sandstone 40 may not include the silicate components.

As previously discussed in this disclosure, the pore surfaces 42 of sandstone 40 may include silicate compounds 44. The silane compounds 34 of the polymer gel composition may chemically interact with the silicate compounds 44 at the pore surfaces 42 of the sandstone 40 and with the base polymer in the cross-linked polymer gel matrix 33 formed by cross-linking of the base polymer by the cross-linking agent. For example, the silane compounds 34, which can be an amino silane such as 3-aminopropyltriethoxysilane as shown in FIG. 2 or any other amino silane, may chemically react with the silicate compounds 44 of the pore surface 42 of the sandstone 40 through an alcohol condensation reaction. The alcohol condensation reaction may chemically bond the silane compounds 34 to the silicate compounds 44 at the pore surface 42 of the sandstone. The amine functional groups of the silane compounds 34 may undergo an amidation reaction with the base polymer to chemically bond the silane compounds to the cross-linked polymer gel matrix 33. The chemical bonds of the silane compounds 34 with the silicate compounds 44 at the pore surface 42 and with the cross-linked polymer gel matrix 33 may adhere the cross-linked polymer gel matrix 33 to the pore surface 42 of the sandstone 40.

Figure 3:
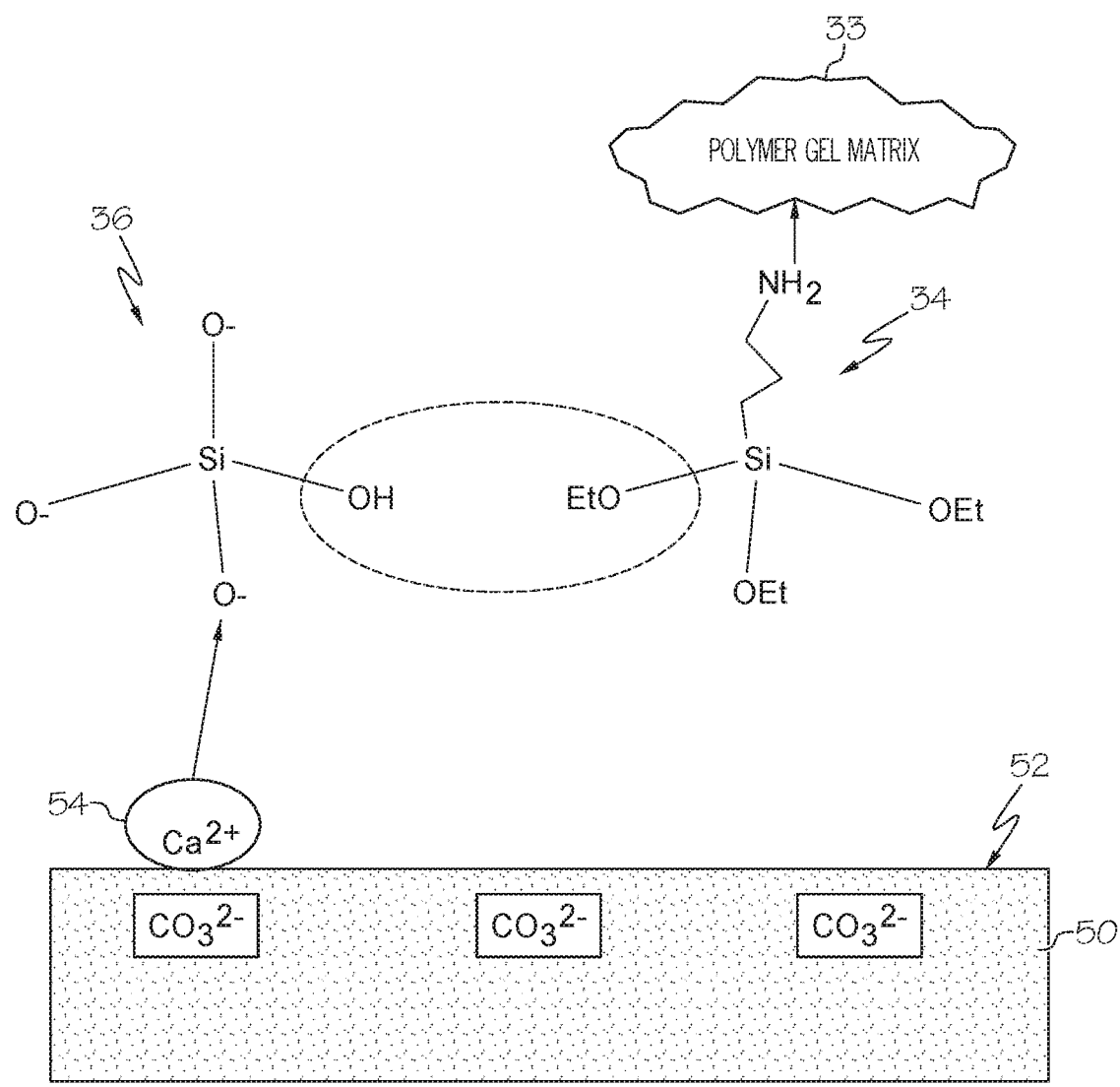
FIG. 3 schematically depicts operation of an adsorption system of a polymer gel composition to chemically adhere the polymer gel composition to pore surfaces of a carbonate formation, according to one or more embodiments shown and described in the present disclosure.

Referring to FIG. 3, in some circumstances, the aqueous zone may be disclosed in a carbonate formation comprising carbonate rock 50, which may not have an amount of silicate compounds at the pore surface 52 sufficient to adhere to the silane compounds 34 of the polymer gel composition. Carbonate rock 50 may include carbonate compounds, such as but not limited to calcium carbonate as shown in FIG. 3, at the pore surfaces 52. To improve adhesion to the pore surfaces 52 of the carbonate rock 50, the silicate components 36 may be included in the polymer gel composition. For example, a polymer gel composition for treating an aqueous zone comprising carbonate rock 50 may include the base polymer, the cross-linking agent, the silane compounds 34, and the silicate components 36. In particular, in some embodiments, the polymer gel composition for treating an aqueous zone comprising sandstone 40 may include from 3 wt. % to 10 wt. % base polymer, from 0.3 wt. % to 2 wt. % cross-linking agent, from 3 wt. % to 10 wt. % silane compounds, from 2 wt. % to 7 wt. % aqueous silicate solution, and the balance water, where the weight percentages are based on the total weight of the polymer gel composition. The base polymer, cross-linking agent, silane compounds, and silicate components may be any of the compounds previously described in this disclosure for the base polymer, cross-linking agent, silane compound, and silicate components, respectively.

Referring again to FIG. 3, as previously discussed in the present disclosure, the pore surfaces 52 of the carbonate rock 50 may be free of or have negligible concentrations of silicates but may include carbonates, such as but not limited to calcium carbonate. In other words, the pore surface 52 of the carbonate rock 50 may have an amount of silicate compounds that is insufficient to increase the adhesion of the cross-linked polymer gel matrix to the pore surfaces 52 through chemical interaction between the silicate compounds and the silane compounds of the polymer gel composition. When present, the silicate components, such as calcium silicate or sodium silicate, of the polymer gel composition may at least partially dissociate in aqueous solution to produce free silicate ions 36, which are negatively charged. The free silicate ions 36 may chemically interact with metal ions, such as calcium ions 54, at the pore surface 52 to couple the silicate ions 36 to the pore surface 52. The silane compounds 34 of the polymer gel composition may chemically interact with the silicate ions 36 chemically attached to the pore surfaces 52 of the carbonate rock 50 and with the base polymer in the cross-linked polymer gel matrix 33 formed by cross-linking of the base polymer by the cross-linking agent. For example, the silane compounds 34, which can be an amino silane such as 3-aminopropyltriethoxysilane as shown in FIG. 3 or any other amino silane, may chemically react with the silicate ions 36 through an alcohol condensation reaction. The alcohol condensation reaction may chemically bond the silane compounds 34 to the silicate ions 36, which may be bonded to the pore surface 52 through chemical interaction with metal ions in the pore surface 52. The amine functional groups of the silane compounds 34 may undergo an amidation reaction with the base polymer to chemically bond the silane compounds to the cross-linked polymer gel matrix 33. The chemical bonds formed by the silane compounds 34 and the silicate ions 36 may chemically adhere the cross-linked polymer gel matrix 33 to the pore surface 52 of the carbonate rock 50.

The adhesion of the cross-linked polymer gel matrix 33 to the pore surface (42, 52) through chemical interaction of the adsorption system components (silane compounds or silane compounds and silicate components) with species at the pore surfaces (42, 52) may be greater than adhesion of existing polymer gel systems. The increased adhesion of the cross-linked polymer gel matrix 33 formed by the polymer gel compositions of the present disclosure may improve the plugging efficiency and service life of the barrier 32 formed by the cross-linked polymer gel matrix compared to existing polymer gel systems.

The cross-linked polymer gel matrix 33 formed from gelation or curing of the polymer gel composition may have a storage modulus sufficient to maintain the cross-linked polymer gel matrix 33 in the pores of the aqueous zone 24. The storage modulus of the cross-linked polymer gel matrix 33 may be indicative of the gel strength of the cross-linked polymer gel matrix 33. In some embodiments, the cross-linked polymer gel matrix 33 may have a storage modulus of greater than or equal to 1500 pascals (Pa), such as greater than or equal to 1800 Pa, or even greater than or equal to 2000 Pa. The storage modulus of the cross-linked polymer gel matrix may be determined using an oscillatory gel moduli rheometer according to known methods. In some embodiments, the cross-linked polymer gel matrix 33 may have a storage modulus that is at least 1.5 times, at least 1.8 times, or at least 2.0 times the storage modulus of a polymer gel that includes the same base polymer and cross-linking agent in the same amounts as the cross-linked polymer gel matrix but does not include the adsorption system (silane compounds or silane compounds and silicates).

Referring again to FIG. 1, methods for treating an aqueous zone 24 of a subterranean formation 22 may include injecting the polymer gel composition 30 from the wellbore 10 into at least a portion of the aqueous zone 24 of the subterranean formation 22. The polymer gel composition 30 may include at least the base polymer, the cross-linking agent, and the silane compound, each of which may be any of the compounds previously described in the present disclosure for the base polymer, the cross-linking agent, and the silane compound, respectively. The polymer gel composition 30 may have a viscosity of from 5 centipoise to 10 centipoise prior to injection into the aqueous zone 24. The methods may further include curing the polymer gel composition 30 in the portion of the aqueous zone 24, where curing the polymer gel composition may produce a barrier 32 that may be operable to reduce or prevent aqueous materials from flowing from the aqueous zone 24 into the wellbore 10. The polymer gel composition 30 may be injected into the aqueous zone 24 through the drill string, production tubing, coiled tubing, or any other commercially-available injection devices.

In some embodiments, the methods may further include introducing a spacer fluid into the aqueous zone 24 before injecting the polymer gel composition 30. The spacer fluid may provide separation between the polymer gel composition 30 and other fluids that may be incompatible with the polymer gel composition 30, such as but not limited to drilling fluids or production fluids for example. In some embodiments, the methods may further include pumping a displacement fluid into the wellbore 10 after the polymer gel composition 30 to displace the polymer gel composition 30 into the aqueous zone 24. Once the polymer gel composition 30 cures to form the cross-linked polymer gel matrix 33, the method may further include resuming drilling of or production of hydrocarbons from the wellbore 10.

EXAMPLES

The various embodiments of the polymer gel compositions and adsorption system of the polymer gel compositions for treating aqueous zones of a subterranean formation will be further clarified by the following examples. The examples are illustrative in nature, and should not be understood to limit the subject matter of the present disclosure.

Comparative Example 1: Comparative Polymer Gel without the Adsorption System

In Comparative Example 1, a comparative polymer gel that does not include the adsorption system was prepared for evaluation against the polymer gel compositions of the present disclosure. The comparative polymer gel of Comparative Example 1 was prepared by adding a measured amount of water to a container and agitating the water. An amount of potassium chloride (KCl) was added to the water and stirred until all of the KCl dissolved. Next, the base polymer was added to the solution. The base polymer was poly[acrylamide-co-(tert-butyl acrylate)] (PAtBA). After the base polymer, an amount of polyethyleneimide (PEI) was then added to the aqueous solution as the cross-linking agent to form the comparative polymer gel. The comparative polymer gel was stirred for an additional 10 to 20 minutes to homogenize the aqueous solution. The comparative polymer gel of Comparative Example 1 is listed in Table 1, which is subsequently provided in this disclosure.

Examples 2-5: Polymer Gel Compositions Including the Adsorption System

In Examples 2-5, various polymer gel compositions were prepared and the gelation time and gel strength of the polymer gel compositions were evaluated in comparison to the comparative polymer gel of Comparative Example 1. The polymer gel compositions of Examples 2-5 were prepared by adding a measured amount of water to a container and agitating the water. The adsorption system components were then added to the container while stirring the solution. For Examples 2-5, the polymer gel compositions included an aqueous solution of sodium silicate (NaSil) as the silicate component and 3-aminopropyltriethoxysilane (APTES) as the silane compound. The concentrations of the NaSil and APTES were varied in Examples 2-5. The aqueous solution of the adsorption system components in water was stirred for an additional 10 to 20 minutes. An amount of potassium chloride (KCl) was added to the aqueous solution and stirred until all of the KCl dissolved. Next, the base polymer was added to the aqueous solution. The base polymer was PAtBA. After the base polymer, an amount of polyethyleneimide (PEI) was then added to the aqueous solution as the cross-linking agent to form the polymer gel compositions. The polymer gel compositions were stirred for an additional 10 to 20 minutes to homogenize the aqueous solution. The polymer gel compositions of Examples 1-5 are listed in Table 1, which is subsequently provided in this disclosure.

TABLE 1

Polymer Gel Compositions of Examples 1-5

| Component | Comp. Ex. 1 | Ex. 2 | Ex. 3 | Ex. 4 | Ex. 5 |
| --- | --- | --- | --- | --- | --- |
| PAtBA (wt. %) | 5.0 | 5.0 | 5.0 | 5.0 | 5.0 |
| PEI (wt. %) | 2.0 | 2.0 | 2.0 | 2.0 | 2.0 |
| KCl (wt. %) | 2.0 | 2.0 | 2.0 | 2.0 | 2.0 |
| NaSil (wt. %) | — | 3.57 | 7.14 | 9.38 | 14.29 |
| APTES (wt. %) | — | 2.38 | 4.76 | 6.25 | 9.52 |
| Water | balance | balance | balance | balance | balance |
| Reference No. in FIG. 4 | 402 | 404 | 406 | 408 | 410 |

Figure 4:
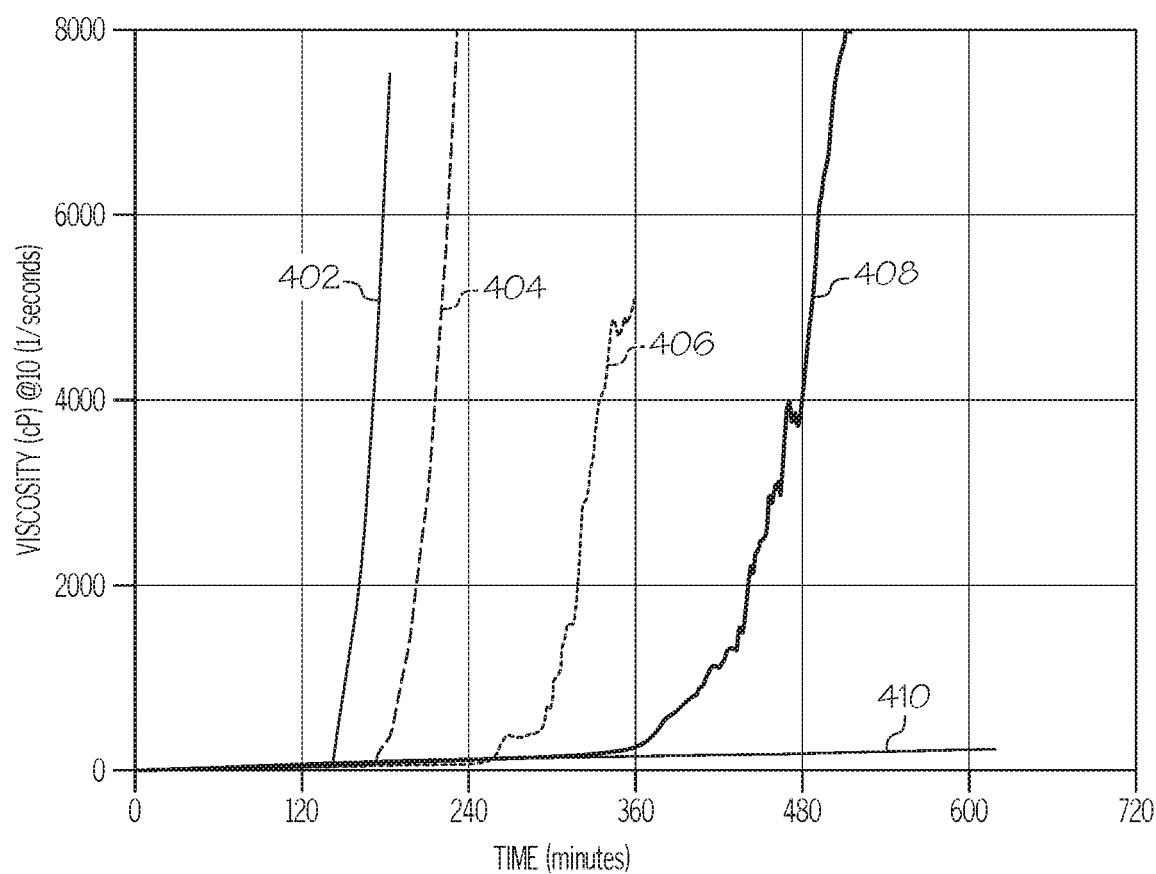
FIG. 4 graphically depicts viscosity (y-axis) as a function of time (x-axis) during curing of various polymer gel compositions, according to one or more embodiments shown and described in the present disclosure.

The comparative polymer gel of Comparative Example 1 and the polymer gel compositions Examples 1-5 were added to the cup of a standard oilfield viscometer, and the viscosity of each of the polymer gel compositions was measured as a function of time as the polymer gel compositions cured to form a cross-linked polymer gel matrix. The polymer gels were maintained at 80 degrees Celsius (° C.). The angular frequency of the viscometer was set to 10 (1/seconds) and the viscosity was measured in centipoise (cP). Referring to FIG. 4, the viscosity (y-axis) as a function of time (x-axis) for the comparative polymer gel of Comparative Example 1 and each of the polymer gel compositions of Examples 2-5 is graphically depicted. The graphical depiction of viscosity as a function of time may provide an indication of the gelation time of each polymer gel, which may be the time at which the viscosity sharply increases. As shown in FIG. 4, the gelation time may increase as the concentrations of the adsorption system components increase. Referring to FIG. 4, when the concentration of APTES was increased from 3.57 wt. % in Example 2 to 7.14 wt. %, 9.38 wt. %, and 14.29 wt. % in Examples 3-5, respectively, the gelation time was significantly increased from 180 minutes (min) to 270 min, 360 min, and over 600 min, respectively, indicating that greater concentrations of adsorption components may delay the gelation time to a greater extent compared to lesser concentration of adsorption components. Thus, the delaying effect of the adsorption system may depend on the concentrations of the components of the adsorption system. Different gelation times may be achieved by adjusting the concentrations of the adsorption components, such as the concentrations of the silane compounds, silicate components, or both, in the polymer gel compositions.

Comparative Example 6: Comparative Polymer Gel without the Adsorption System

In Comparative Example 6, a comparative polymer gel composition was prepared according to the method previously described in Comparative Example 1. For Comparative Example 6, the comparative polymer gel included 5.0 wt. % PAtBA as the base polymer, 1.3 wt. % PEI as the cross-linking agent, and 2.0 wt. % KCl. The comparative polymer gel did not include a silane compound or a silicate component. The comparative polymer gel was prepared at a temperature of 93° C. (200° F.) and then cooled to room temperature.

Example 7: Storage Modulus of a Polymer Gel Composition Including the Adsorption System In Example 7, a polymer gel composition including the adsorption system was prepared and the storage modulus was evaluated in comparison to the storage modulus of the comparative polymer gel of Comparative Example 6. For Example 7, the polymer gel composition was prepared in accordance with the procedure described previously in Examples 2-5. The polymer gel composition included the same base polymer, cross-linking agent, and salinity as the comparative polymer gel of Comparative Example 6. The polymer gel composition of Example 7 further included 4.76 wt. % APTES as the silane compound and 7.14 wt. % NaSil as the silicate component. The polymer gel composition of Example 7 was prepared at a temperature of 93° C. (200° F.) and then cooled to room temperature.

The cross-linked comparative polymer gel of Comparative Example 6 and the cross-linked polymer gel matrix of Example 7 were then evaluated for elastic modulus to provide an indication of the relative gel strengths of each of the polymer gels. The elastic modulus for each polymer gel was determined from oscillatory gel moduli measurements using an Anton Paar MCR 502 rheometer (MCR-modular compact rheometer), which was equipped with a 35-mm parallel plate geometry and having a 1 millimeter gap between the plates. The oscillatory gel moduli measurements were conducted at room temperature of 20° C.

The oscillatory gel moduli measurements were conducted according to the subsequently described procedure. First, several trial oscillatory amplitude sweep tests were conducted under constant shear rate (CSR) mode. In the oscillatory amplitude sweep tests, the strain (deformation) was ramped from 0.1 percent (%) to 100%, and the angular frequency was maintained at a constant value of 1 hertz (Hz). The trial oscillatory amplitude sweep tests were used to determine the linear viscoelastic (LVE) region for each of the polymer gels. Following the initial trial oscillatory amplitude sweep tests, gel strength characterization tests were performed by conducting oscillatory frequency sweep tests on each of the polymer gels. For all of the oscillatory frequency sweep tests, a constant strain of 2% was maintained and the applied oscillatory shear frequency was varied from 0.1 radians per second (rad/s) to 100 rad/s. The stress response to a strain of 2% was confirmed to be within the LVE regime for each polymer gel based on the trial oscillatory amplitude sweep tests. The measured elastic modulus (G') was measured at each frequency. The measured elastic modulus G' is used as a quantitative indicator of the gel strength and for comparing gel strength of different samples.

Figure 5:
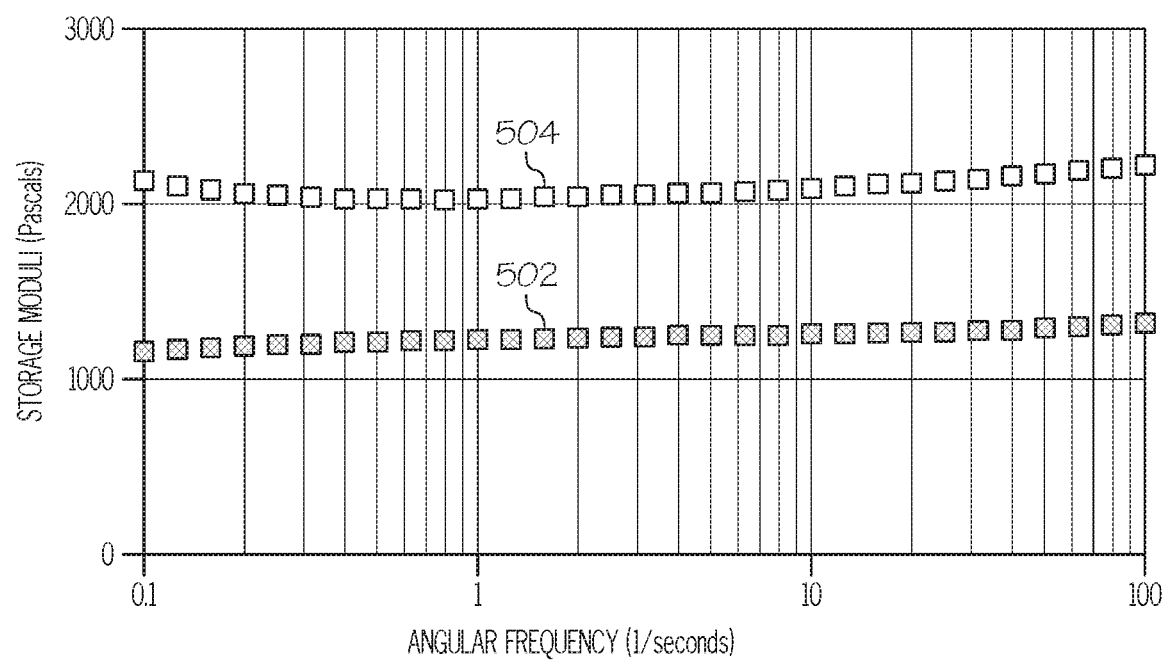
FIG. 5 graphically depicts storage moduli (y-axis) as a function of angular frequency (x-axis) for oscillatory gel moduli rheometer measurements taken for a polymer gel comprising only a base polymer and cross-linking agent and for a cross-linked polymer gel matrix formed from a base polymer, cross-linking agent, and adsorption system, according to one or more embodiments shown and described in the present disclosure.

Referring to FIG. 5, the storage moduli G' (y-axis) in pascals as a function of angular frequency of the oscillatory gel moduli rheometer (x-axis) in units of 1/seconds for Comparative Example 6 (reference number 502) and Example 7 (reference number 504) are depicted. As shown in FIG. 5, the storage moduli G' of the cross-linked polymer gel matrix of Example 7 (504) were almost 2 times the storage moduli G' of the cross-linked comparative polymer gel of Comparative Example 6 (502). Thus, the incorporation of the adsorption system into the polymer gel composition may substantially increase the gel strength of the cross-linked polymer gel matrix formed from curing the polymer gel composition.

Example 8: Dynamic Adsorption Test of the Adsorption System

For Example 8, dynamic adsorption tests were conducted on a composition comprising only the adsorption system components. The composition of Example 8 was prepared according to the method previously described in relation to Examples 2-5, except that the base polymer and the cross-linking agent are replaced by equal parts water. Thus, the composition of Example 8 consisted of 2.0 wt. % KCl, 4.76 wt. % APTES as the silane compound, 7.14 wt. % NaSil as the silicate component, and the balance water.

The dynamic adsorption test was performed on the composition of Example 8 using a carbonate core plug according to the test methods described in American Petroleum Institute (AIP) Recommended Practice 40. A Coretest core flooding system model RPS-812-Z was used to conduct the core testing. Initially, the carbonate core plug was dried in an oven at 100° C. until the weight of the carbonate core plug stabilized. Then, the carbonate core plug was fully saturated with brine solution comprising 2 wt. % KCl in water. The permeability of the brine solution through the untreated carbonate core plug was measured to be 345 millidarcies (mD) at 1500 pounds per square inch (psi) (10342 kilopascals (kPa) net confined pressure. As used in the present disclosure, the term "permeability" may refer to the ability, or measurement of a rock's ability to transmit fluids, which is typically measured in darcies or millidarcies (mD).

The dynamic adsorption test was performed on the carbonate core plug using the Coretest core flooding system discussed previously in this disclosure. The dynamic adsorption test was conducted by injecting the composition of Example 8 comprising the adsorption system into the carbonate core plug. More than ten pore volumes (PV) of the composition of Example 8 were injected into the carbonate core plug. The dynamic adsorption test was conducted at a constant flow rate of the composition of Example 8 of 1.0 cubic centimeters per minute (cm3/min) at a net confining pressure of 2500 psi (17236 kPa) and a temperature of 95° C. The effluent samples were collected and the concentration were analyzed by total organic carbon (TOC) method.

Figure 6:
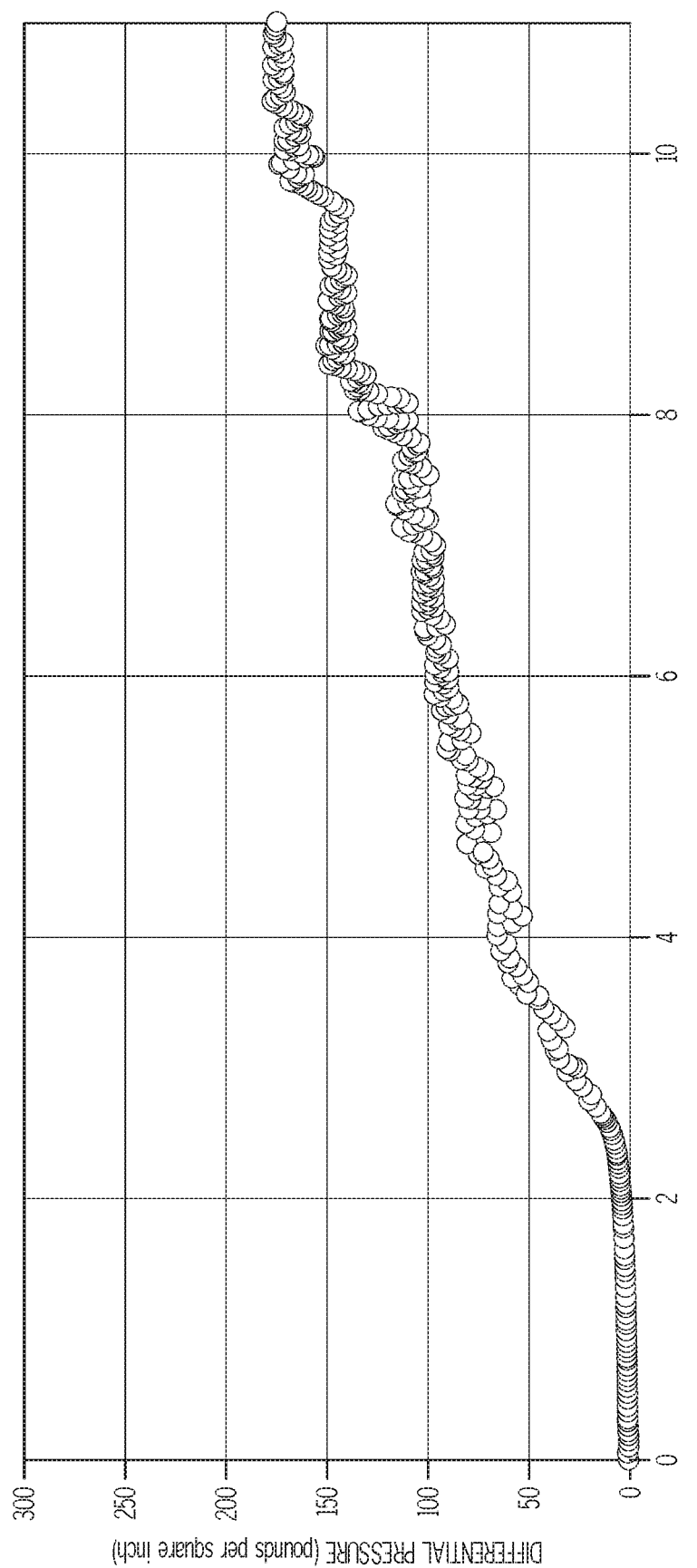
FIG. 6 graphically depicts differential pressure (y-axis) as a function of pore volume injected (x-axis) for a dynamic adsorption core test for an adsorption system, according to one or more embodiments shown and described in the present disclosure.
Figure 7:
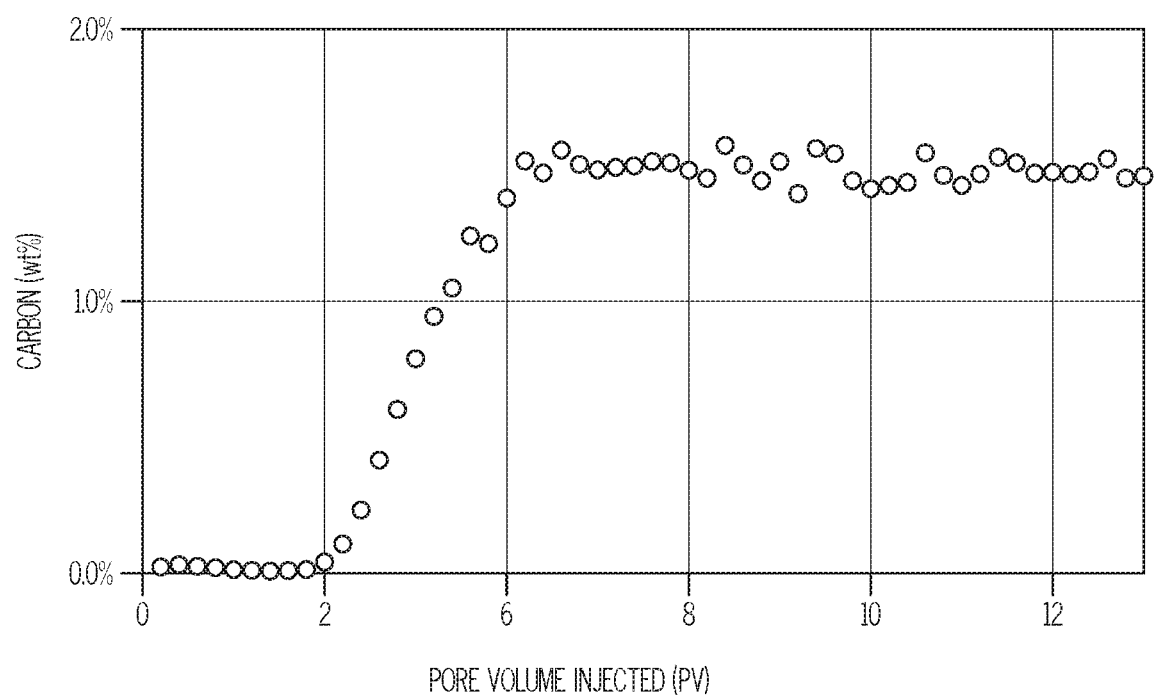
FIG. 7 graphically depicts total organic carbon (y-axis) as a function of pore volume injected (x-axis) for the dynamic adsorption core test for the adsorption system of FIG. 6, according to one or more embodiments shown and described in the present disclosure.

Referring to FIG. 6, the differential pressure across the carbonate core plug (y-axis) as a function of the volume of the composition of Example 8 injected into the carbonate core plug (x-axis) is graphically depicted. Once injection of the composition of Example 8 into the carbonate core plug started, the differential pressure across the carbonate core plug steadily increased for a flow rate of 1 cm$^3$/min, as shown by the gradual increase in the differential pressure shown in FIG. 6. This increase in differential pressure indicates chemical interactions occurring between the adsorption components of the fluid and the pore surfaces of the carbonate core plug. The presence of chemical interaction between the adsorption components is confirmed by the TOC concentrations in the effluent as a function of pore volume of the composition of Example 8, which is graphically depicted in FIG. 7. As shown in FIG. 7, the concentration of total organic carbon increases above 2 pore volumes injected. This indicates increasing concentration of organic compounds in the effluent. As previously discussed, for carbonate formations, the silicate of the adsorption system may chemically interact with the ethoxy groups of the APTES silane compound through a hydrolysis reaction. Hydrolysis of an ethoxy group on the APTES silane compound produces ethanol ($C_2H_5OH$), which exits the carbonate core plug in the effluent. Increasing chemical reaction of the silane compound with the silicate increases the concentration of ethanol in the effluent. Thus, increased chemical reaction between components of the adsorption system is confirmed by the total organic carbon measurements shown in FIG. 7.

Example 9: Thermal Stability and Durability Testing of the Polymer Gel Composition Including the Adsorption System In Example 9, a polymer gel composition including the adsorption system was prepared and evaluated for thermal stability and durability. The polymer gel composition of Example 9 was prepared according to the process previously described in this disclosure in relation to Example 2-5. The polymer gel composition included 5 wt. % PAtBA as the base polymer, 2.0 wt. % PEI as the cross-linking agent, 2.0 wt. % KCl, 4.76 wt. % APTES as the silane compound, 7.14 wt. % sodium silicate, and the balance water.

The polymer gel composition of Example 9 was subjected to thermal stability testing by preparing the polymer gel composition and placing the polymer gel composition in an oven maintained at 93° C. (200° F.) for an extended period. It was observed that the polymer gel composition cured to form a cross-linked polymer gel matrix and the cross-linked polymer gel matrix maintained its three dimensional gel structure for a period of at least 30 days at the temperature of 93° C. without breaking down. Thus, the cross-linked polymer gel matrices formed by the polymer gel compositions of the present disclosure can provide effective water control from aqueous zones for an extended period of time at elevated temperature.

Figure 8:
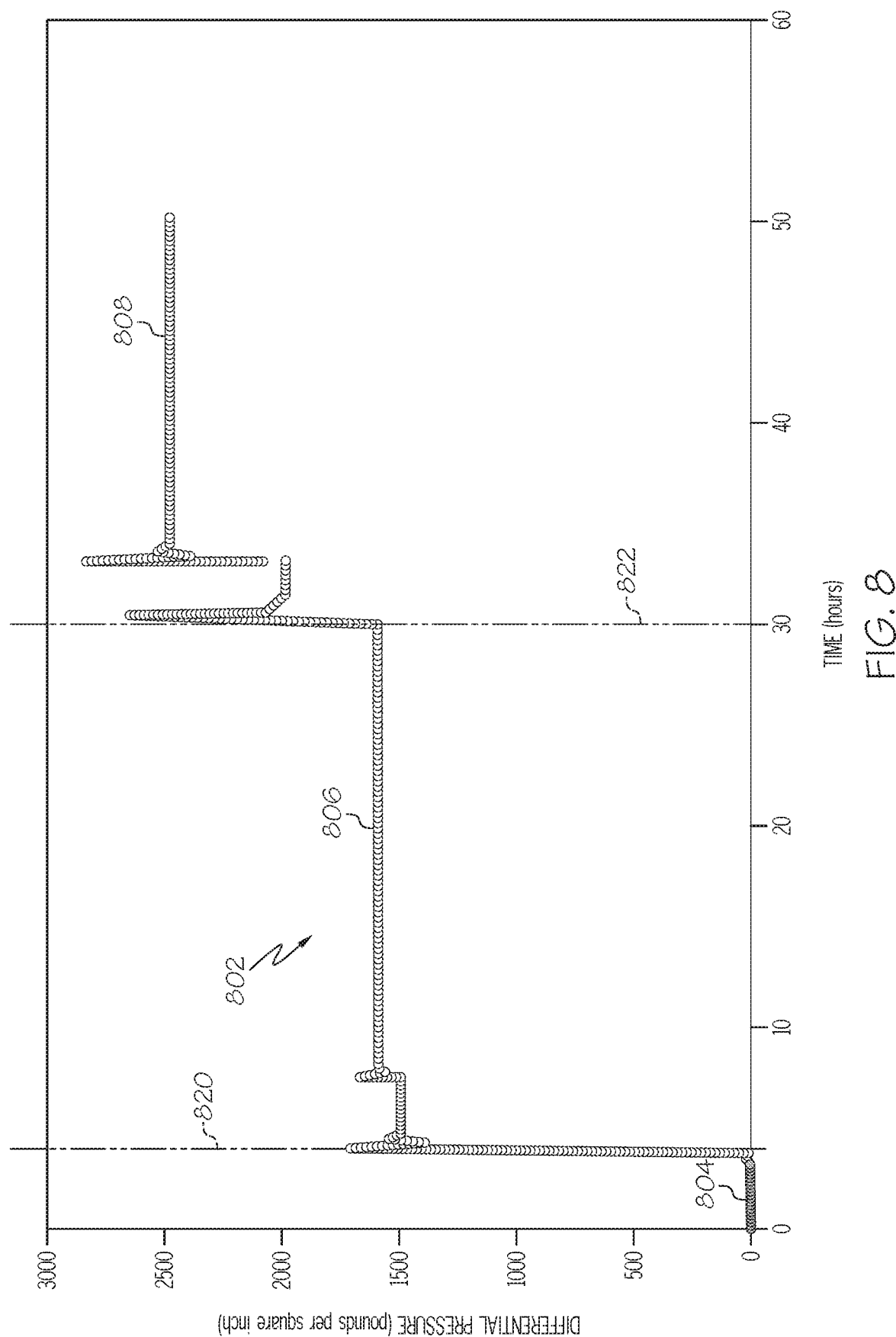
FIG. 8 graphically depicts differential pressure (y-axis) as a function of time (x-axis) for a dynamic adsorption core test for a polymer gel composition, according to one or more embodiments shown and described in the present disclosure.

The polymer gel composition of Example 9 was further evaluated for durability by treating a carbonate core plug sample with the polymer gel composition and then attempting to pass an aqueous KCl solution through the treated carbonate core plug sample using the Coretest core flooding system of Example 8. First, an aqueous solution of 2 wt. % KCl in water was passed through the untreated carbonate core plug sample. Referring to FIG. 8, the differential pressure 802 as a function of time (x-axis) for the durability testing of Example 9 is graphically depicted. In FIG. 8, the region identified by reference number 804 corresponds to the untreated carbonate core plug sample. The differential pressure was very low at 1.8 psi (12.4 kPa) with the greatest flow rate of aqueous solution measured to be 4 milliliters per minute.

The carbonate core plug sample was then treated with the polymer gel composition of Example 9 and allowed to cure for a period of 24 hours. Following treatment and curing, the treated carbonate core plug sample was subjected to a flow of an aqueous solution of 2 wt. % KCl in water. Initial start of injection of the KCl solution is identified by reference number 820 in FIG. 8. The differential pressure increased to a pressure of 1580 psi (10,894 kPa) in the region identified by reference number 806. The treated carbonate core plug sample was maintained at a differential pressure of 1580 psi to a total time of 30 hours. No water breakthrough through the treated carbonate core plug sample was observed at the differential pressure of 1580 psi during this time period. The measured differential pressure of 1580 psi for the treated carbonate core plug sample is equivalent to 6320 psi per foot of holding pressure for the cross-linked polymer gel matrix formed by the polymer gel composition.

After 30 hours (reference number 822 in FIG. 8), the injection pressure was increased to 2477 psi (17,078 kPa) for an additional 20 hours. The period of increased pressure is identified in FIG. 8 by reference number 808. No water breakthrough through the treated carbonate core plug sample was observed at the greater differential pressure. The differential pressure of 2477 psi is equivalent 9908 psi per foot of holding pressure for the cross-linked polymer gel matrix formed by the polymer gel composition.

In a first aspect of the present disclosure, a method for treating an aqueous zone of a subterranean formation may include injecting a polymer gel composition into at least a portion of the aqueous zone of the subterranean formation. The polymer gel composition may include a base polymer, a cross-linking agent, and an adsorption system comprising at least a silane compound. The polymer gel composition may have a viscosity of from 5 centipoise to 10 centipoise prior to injection into the aqueous zone. The method may further include curing the polymer gel composition in the portion of the aqueous zone to produce a cross-linked polymer gel matrix. The cross-linked polymer gel matrix may produce a barrier that reduces or prevents aqueous materials from flowing from the aqueous zone into a wellbore.

A second aspect of the present disclosure may include the first aspect, where the adsorption system may further comprises a silicate component.

A third aspect of the present disclosure may include the second aspect, where the silicate component may comprise sodium silicate, potassium silicate, or both.

A fourth aspect of the present disclosure may include any of the first through third aspects, where the polymer gel composition may comprise from 3 weight percent to 10 weight percent base polymer based on the total weight of the polymer gel system, from 0.3 weight percent to 2.0 weight percent cross-linking agent based on the total weight of the polymer gel system, from 3 weight percent to 10 weight percent silane compound based on the total weight of the polymer gel system, from 2 weight percent to 7 weight percent aqueous silicate solution based on the total weight of the polymer gel system, and the balance water.

A fifth aspect of the present disclosure may include any of the first through fourth aspects, further comprising pumping a displacement fluid into the wellbore after the polymer gel composition, where the displacement fluid may displace the polymer gel composition into the aqueous zone.

A sixth aspect of the present disclosure may include any of the first through fifth aspects, further comprising introducing a spacer fluid into the aqueous zone before injecting the polymer gel composition.

A seventh aspect of the present disclosure may include any of the first through sixth aspects, in which the polymer gel composition may be injected into the aqueous zone through the drill string, production tubing, or coiled tubing.

In an eighth aspect of the present disclosure, a polymer gel composition for treating an aqueous zone of a subterranean formation may include from 3 weight percent to 10 weight percent base polymer based on the total weight of the polymer gel composition, from 0.3 weight percent to 2.0 weight percent cross-linking agent based on the total weight of the polymer gel composition, from 3 weight percent to 10 weight percent silane compound based on the total weight of the polymer gel composition, and the balance water.

A ninth aspect of the present disclosure may include the eighth aspect, further comprising from 2 weight percent to 7 weight percent aqueous silicate solution based on the total weight of the polymer gel composition.

A tenth aspect of the present disclosure may include the ninth aspect, where the aqueous silicate solution may comprise sodium silicate, potassium silicate, or both.

An eleventh aspect of the present disclosure may include any of the first through tenth aspects, where the polymer gel composition may further comprise one or more salts.

A twelfth aspect of the present disclosure may include the eleventh aspect, in which the one or more salts may comprise ammonium chloride, potassium chloride, or both.

A thirteenth aspect of the present disclosure may include any of the first through twelfth aspects, in which the base polymer may include one or more of polyacrylamide homopolymers, polyamide acrylates, or both.

A fourteenth aspect of the present disclosure may include any of the first through thirteenth aspects, in which the base polymer may have an average molecular weight of from 250,000 to 500,000 grams per mole.

A fifteenth aspect of the present disclosure may include any of the first through fourteenth aspects, in which the base polymer may comprise poly[acrylamide-co-(tert-butyl acrylate)], polyacrylamide homopolymer, or poly[acrylamide-co-(tert-butyl acrylate)] and polyacrylamide homopolymer.

A sixteenth aspect of the present disclosure may include any of the first through fifteenth aspects, in which the base polymer may comprise poly[acrylamide-co-(tert-butyl acrylate)] copolymer having from 1 mole percent to 50 mole percent tert-butyl acrylate monomer units based on the total number of acrylamide monomer units and tert-butyl acrylate monomer units in the poly[acrylamide-co-(tert-butyl acrylate)].

A seventeenth aspect of the present disclosure may include any of the first through sixteenth aspects, in which the cross-linking agent may comprise an organic cross-linking agent.

An eighteenth aspect of the present disclosure may include any of the first through seventeenth aspects, in which the cross-linking agent may comprise an imine.

A nineteenth aspect of the present disclosure may include any of the first through eighteenth aspects, in which the cross-linking agent may comprise polyethyleneimine.

A twentieth aspect of the present disclosure may include any of the first through nineteenth aspects, in which the silane compound may be an amino-silane compound.

A twenty-first aspect of the present disclosure may include the twentieth aspect, in which the amino-silane compound may have the following chemical formula (II):

$$H_2N-R^1-Si(R^2)_3 \qquad (II);$$

In chemical formula (II), $R^1$ may be a linear or branched hydrocarbyl having from 1 to 20 carbon atoms, and each $R^2$ may be independently selected from a linear or branched hydrocarbyl having from 1 to 10 carbons, an amine group, or an alkoxy group having general formula ($-O-R^3$), where $R^3$ can be a linear or branched hydrocarbyl having from 1 to 10 carbon atoms. At least one of the $R^2$ groups can be an alkoxy group.

A twenty-second aspect of the present disclosure may include any of the first through twenty-first aspects, in which the silane compound comprises 3-aminopropyltriethoxysilane, 3-aminopropyltrimethoxysilane, or both.

A twenty-third aspect of the present disclosure may include any of the first through twenty-second aspects, in which the polymer gel composition has a pH of from 9 to 14.

A twenty-fourth aspect of the present disclosure may include any of the first through twenty-third aspects, in which the polymer gel composition has a salinity of less than or equal to 5 wt. %, or less than or equal to 4 wt. %, or less than or equal to 3.6 wt. %.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for treating an aqueous zone of a subterranean formation, the method comprising:
   injecting a polymer gel composition into at least a portion of the aqueous zone of the subterranean formation, the polymer gel composition comprising:
      a base polymer comprising poly[acrylamide-co-(tert-butyl acrylate)], polyacrylamide homopolymer, or poly[acrylamide-co-(tert-butyl acrylate)] and polyacrylamide homopolymer;
      a cross-linking agent; and
      an adsorption system comprising at least a silane compound;
      where the polymer gel composition has a viscosity of from 5 centipoise to 10 centipoise prior to injection into the aqueous zone;
   curing the polymer gel composition in the portion of the aqueous zone to produce a cross-linked polymer gel matrix, where the cross-linked polymer gel matrix produces a barrier that reduces or prevents aqueous materials from flowing from the aqueous zone into a wellbore.

2. The method of claim 1, where the adsorption system further comprises a silicate component selected from sodium silicate, potassium silicate, or both.

3. The method of claim 1, where the polymer gel composition further comprises one or more salts selected from ammonium chloride, potassium chloride, or both.

4. The method of claim 1, in which the base polymer includes polyacrylamides, polyimide acrylates, or both.

5. The method of claim 1, in which the base polymer has an average molecular weight of from 250,000 to 500,000 grams per mole.

6. The method of claim 1, in which the cross-linking agent comprises polyethyleneimine.

7. The method of claim 1, in which the silane compound is an amino-silane compound having the following chemical formula (II):

$$H_2N-R^1-Si(R^2)_3 \qquad (II)$$

in which:
   $R^1$ is a linear or branched hydrocarbyl having from 1 to 20 carbon atoms; and
   each $R^2$ is independently selected from a linear or branched hydrocarbyl having from 1 to 10 carbons, an amine group, or an alkoxy group having general formula ($-O-R^3$), where $R^3$ can be a linear or branched hydrocarbyl having from 1 to 10 carbon atoms, where at least one $R^2$ is an alkoxy group.

8. The method of claim 1, in which the silane compound comprises 3-aminopropyltriethoxysilane, 3-aminopropyltrimethoxysilane, or both.

9. The method of claim 1, in which the polymer gel composition has a pH of from 9 to 14.

10. The method of claim 1, comprising injecting the polymer gel composition into the aqueous zone through the drill string, production tubing, or coiled tubing.

11. A polymer gel composition for treating an aqueous zone of a subterranean formation, the polymer gel composition comprising:
   from 3 weight percent to 10 weight percent base polymer based on the total weight of the polymer gel composition, where the base polymer comprises poly[acrylamide-co-(tert-butyl acrylate)], polyacrylamide homopolymer, or poly[acrylamide-co-(tert-butyl acrylate)] and polyacrylamide homopolymer;
   from 0.3 weight percent to 2.0 weight percent cross-linking agent based on the total weight of the polymer gel composition;
   from 3 weight percent to 10 weight percent silane compound based on the total weight of the polymer gel composition; and
   the balance water.

12. The polymer gel composition of claim 11, further comprising from 2 weight percent to 7 weight percent aqueous silicate solution based on the total weight of the polymer gel composition.

13. The polymer gel composition of claim 11, where the aqueous silicate solution comprises sodium silicate, potassium silicate, or both.

14. The polymer gel composition of claim 11, in which the base polymer has an average molecular weight of from 250,000 to 500,000 grams per mole.

15. The polymer gel composition of claim 11, in which the cross-linking agent comprises polyethyleneimine.

16. The polymer gel composition of claim 11, in which the silane compound is an amino-silane compound having the following chemical formula (II):

$$H_2N-R^1-Si(R^2)_3 \qquad (II)$$

in which:
   $R^1$ is a linear or branched hydrocarbyl having from 1 to 20 carbon atoms; and
   each $R^2$ is independently selected from a linear or branched hydrocarbyl having from 1 to 10 carbons, an amine group, or an alkoxy group having general formula ($-O-R^3$), where $R^3$ can be a linear or branched hydrocarbyl having from 1 to 10 carbon atoms, where at least one $R^2$ is an alkoxy group.

17. The polymer gel composition of claim 12, in which the silane compound comprises 3-aminopropyltriethoxysilane, 3-aminopropyltrimethoxysilane, or both.

18. The polymer gel composition of claim 12, where an initial viscosity of the polymer gel composition is from 5 centipoise to 10 centipoise at surface atmospheric conditions and before cross-linking of the polymer gel composition.

19. The polymer gel composition of claim 12, in which the polymer gel composition comprises from 5 weight percent to 10 weight percent of the silane compound based on the total weight of the polymer gel composition.

20. The polymer gel composition of claim 12, in which the polymer gel composition consists essentially of:
   from 3 weight percent to 10 weight percent the base polymer based on the total weight of the polymer gel composition;
   from 0.3 weight percent to 2.0 weight percent the cross-linking agent based on the total weight of the polymer gel composition;
   from 3 weight percent to 10 weight percent the silane compound based on the total weight of the polymer gel composition;
   optionally from 2 weight percent to 7 weight percent aqueous silicate solution based on the total weight of the polymer gel composition; and
   the balance water.

* * * * *

UNITED STATES PATENT AND TRADEMARK OFFICE
CERTIFICATE OF CORRECTION

PATENT NO. : 11,111,753 B2
APPLICATION NO. : 16/451793
DATED : September 7, 2021
INVENTOR(S) : Ayman Almohsin et al.

It is certified that error appears in the above-identified patent and that said Letters Patent is hereby corrected as shown below:

On the Title Page

Column 2, item (56), U.S. patent documents, Line 1, delete "Reddy" and insert --Reddy et al.--, therefor.

In page 2, Column 1, item (56), U.S. patent documents, Line 1, delete "Dalrymple" and insert --Dalrymple et al.--, therefor.

In the Claims

In Column 23, Line(s) 30, Claim 4, delete "polyimide" and insert --polyamide--, therefor.

In Column 23, Line(s) 40, Claim 7, delete "(II)" and insert --(II);--, therefor.

In Column 24, Line(s) 26, Claim 16, delete "(II)" and insert --(II);--, therefor.

Signed and Sealed this
Eighth Day of November, 2022

Katherine Kelly Vidal
*Director of the United States Patent and Trademark Office*